No. 796,463. PATENTED AUG. 8, 1905.
D. W. SMITH.
SHEAF CARRIER ATTACHMENT.
APPLICATION FILED MAR. 6, 1905.

3 SHEETS—SHEET 1.

Witnesses:
T. H. Alfnds
F. W. Hoffmeister

Inventor
Daniel W. Smith
By E. W. Burgess
Attorney

No. 796,463. PATENTED AUG. 8, 1905.
D. W. SMITH.
SHEAF CARRIER ATTACHMENT.
APPLICATION FILED MAR. 6, 1905.
3 SHEETS—SHEET 2.
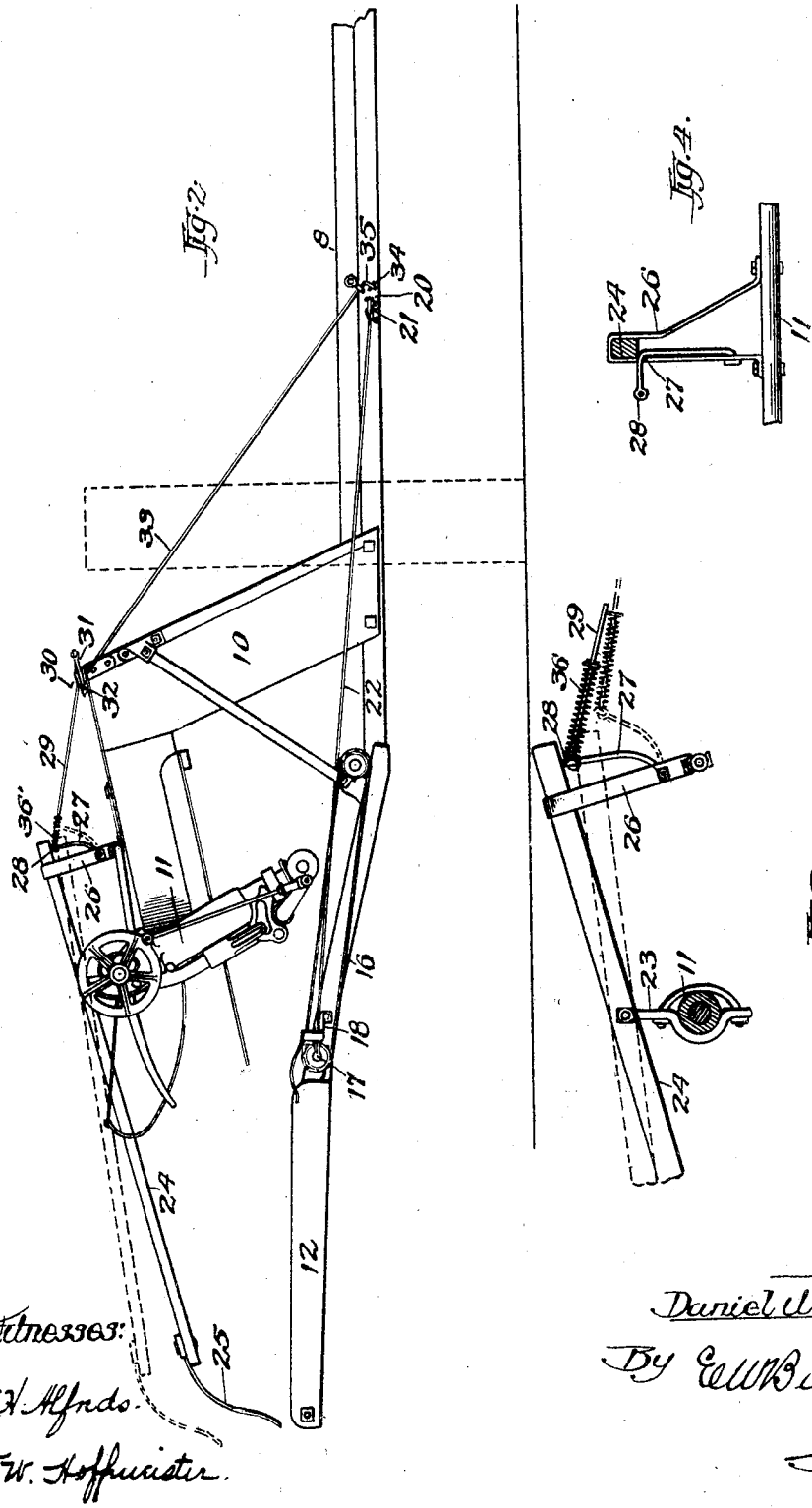

No. 796,463. PATENTED AUG. 8, 1905.
D. W. SMITH.
SHEAF CARRIER ATTACHMENT.
APPLICATION FILED MAR. 6, 1905.
3 SHEETS—SHEET 3.
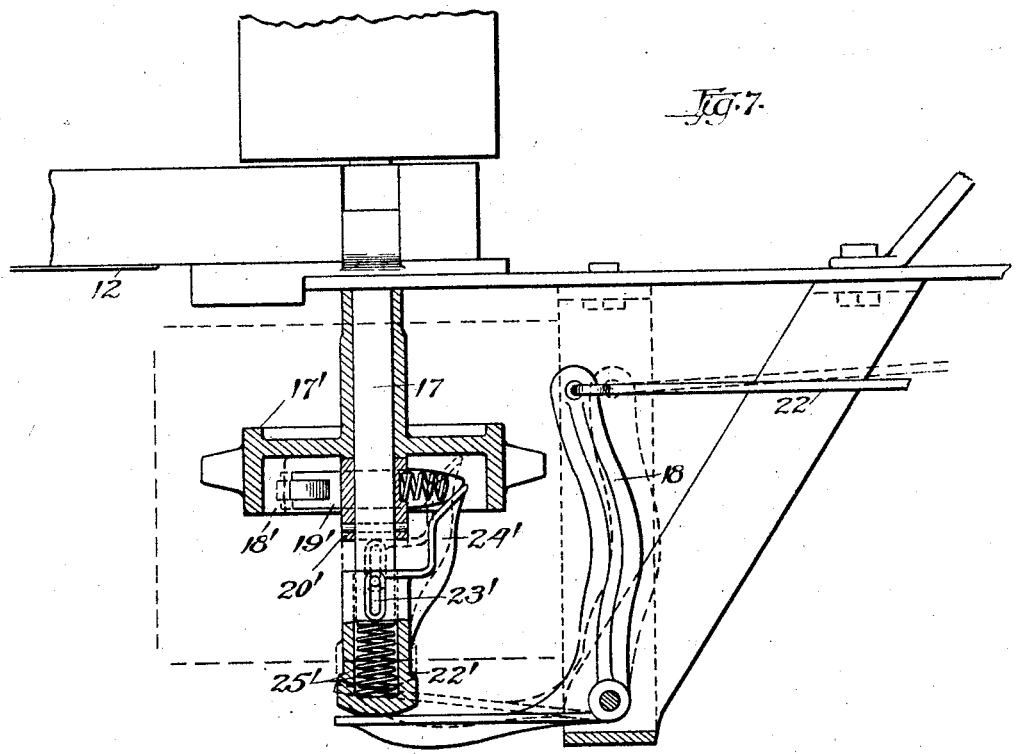
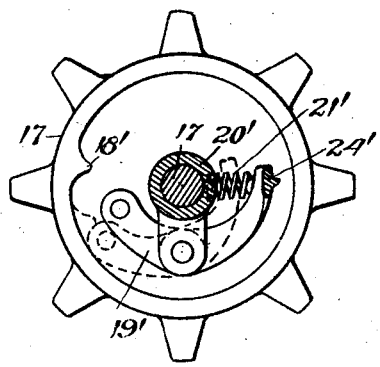
Witnesses:
T. H. Alfred.
F. W. Hoffmeister.
Inventor:
Daniel W. Smith
By E. W. Burgess
Attorney

UNITED STATES PATENT OFFICE.

DANIEL W. SMITH, OF CHICAGO, ILLINOIS, ASSIGNOR TO INTERNATIONAL HARVESTER COMPANY, A CORPORATION OF NEW JERSEY.

SHEAF-CARRIER ATTACHMENT.

No. 796,463.  Specification of Letters Patent.  Patented Aug. 8, 1905.

Application filed March 6, 1905. Serial No. 248,493.

*To all whom it may concern:*

Be it known that I, DANIEL W. SMITH, a citizen of the United States, residing at Chicago, in the county of Cook and State of Illinois, have invented certain new and useful Improvements in Sheaf-Carrier Attachments, of which the following is a specification, reference being had to the accompanying drawings, forming a part thereof.

My invention relates to sheaf-carrier attachments for grain-harvesters, and is particularly designed for use in connection with attachments of the above character having endless-apron carriers operative to deliver the sheaves therefrom, the object of the invention being to provide means for retaining the sheaves upon the carrier and preventing their premature delivery until by the regular operation of the carrier they are deposited upon the ground.

My invention consists in providing a retaining-gate having a vertical movement away from the carrier and adapted to close the delivery end of the carrier and keep it closed until it is tripped into operation to deliver the accumulated load.

It further consists in such details of construction as will be more clearly illustrated by the drawings and described in the specification accompanying this application, in which—

Figure 1:
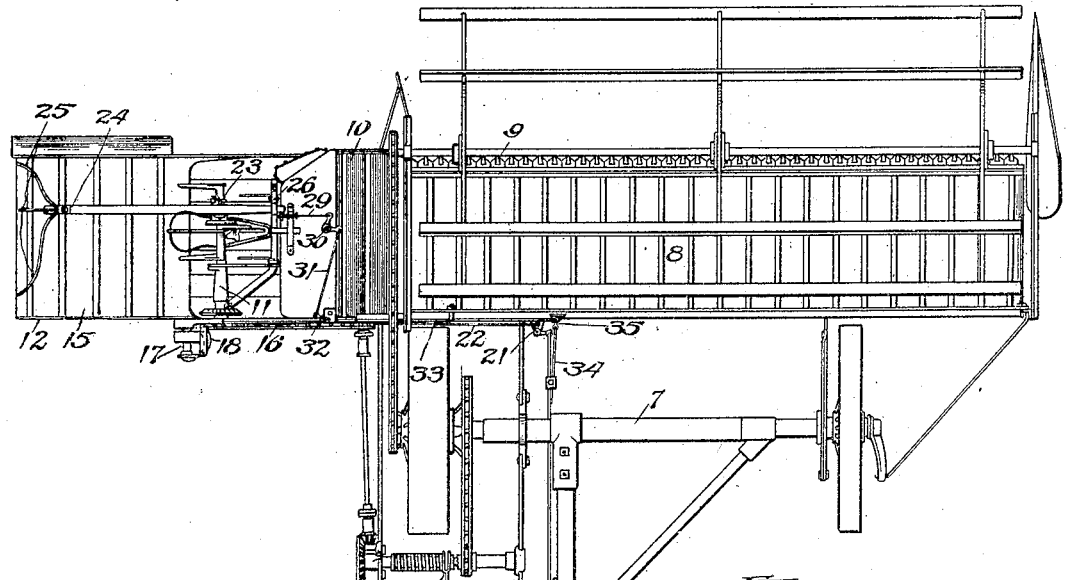
Figure 5:
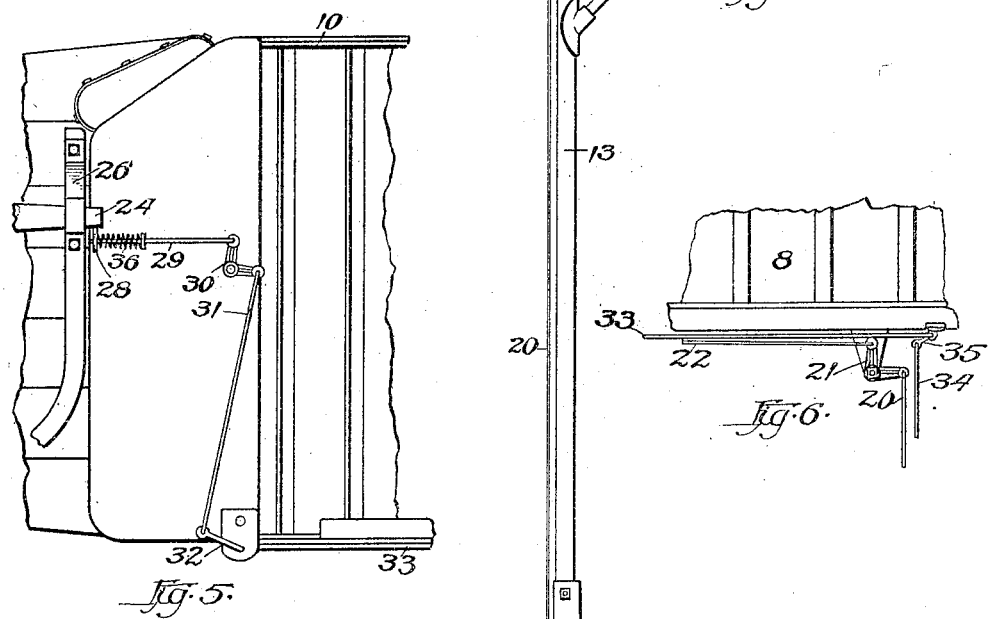
Figure 6:
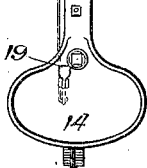

Figure 1 represents a plan view of a grain-harvester having my improved sheaf-carrier attached thereto. Fig. 2 represents an enlarged end view of the carrier attachment with the end-gate applied thereto, and Figs. 3, 4, 5, and 6 represent details of the same. Figs. 7 and 8 represent details of the clutch mechanism.

Referring to the drawings, 7 represents the frame of the harvester, upon which is mounted the grain-platform 8, the cutting apparatus 9, the elevator carriers and frame 10, the binding attachment 11, and the endless-apron sheaf-carrier 12.

13 is the push-pole, suitably attached to the harvester-frame, and 14 is the operator's platform at the rear end of the push-pole.

The sheaf-carrier comprises a suitable frame secured to the harvester and an endless apron 15, suitably mounted on rollers journaled in the frame. The endless apron derives motion by means of a chain belt 16, driven by a moving part of the harvester mechanism and communicating its motion to the driving-shaft 17 of the endless apron in an intermittent manner by means of any of the well-known forms of clutches designed for such purposes and having a shipping-lever 18 forming a part thereof and adapted when moved in one direction to cause the clutch mechanism to engage in a manner to move said endless apron. In the clutch mechanism shown the sprocket-wheel 17' is journaled upon the shaft 17 and is driven by the chain 16. The interior surface of the rim of the sprocket-wheel is provided with one or more teeth 18', and 19' is a curved clutch-lever, pivoted to a part 20', that is secured to the shaft 17. One end of the lever is provided with a roller adapted to engage with the tooth 18', and its opposite end is normally moved outward by the force of a coiled spring 21', interposed between it and the part 20', and the roller is thereby prevented from engaging with the tooth 18'. Upon the extended end of the shaft 17 is a sleeve 22', provided with a slot 23', which engages with a pin in the shaft in a well-known way, and a cam-arm 24', adapted to engage with the lever 19' when the sleeve is moved along the shaft in one direction and depress the clutch-lever 19', as shown by dotted lines in Fig. 7. The sleeve is moved in one direction upon the shaft by means of the bell-crank lever 18 and in the opposite direction by means of the spring 25', as shown in Fig. 7.

Upon the operator's platform is a lever 19, adapted to be operated by the foot of the operator. A link 20 connects said lever with one arm of a bell-crank lever 21, pivotally connected with the harvester-frame and having its opposite end connected with the shipping-lever 18 by means of the link 22 in a manner to move said shipping-lever in one direction at the will of the operator.

Pivotally mounted on a bracket portion 23, secured to the binder-frame 11, is a vibratile bar 24, extending stubbleward and overhanging the sheaf-carrier. A series of fingers 25 are secured to the stubbleward end of the bar and operate to prevent the premature delivery of the sheaves from the carrier when the bar is lowered. The bar extends grainward from its pivotal connection 23 and passes between the arms of a U-shaped bracket 26, that is secured to the spring-rail of the binding attachment. A swinging arm 27 is pivotally connected at one end with the bracket, and its opposite end is bent laterally and provided with an eye 28, adapted to receive the hooked end of a link 29, that has its opposite end connected with one arm of a bell-crank lever 30, pivotally mounted upon the elevator-frame and having its opposite end connected, by means of the link 31, with a crank-arm 32 at the upper end of a rock-shaft 33 at the rear of the elevator-frame. The rock-shaft 33 extends diagonally downward and grainward toward the bell-crank lever 21. A short link 34 is suitably connected with the link 20, and its opposite end is pivotally connected with a crank-arm 35, formed on the lower end of the rock-shaft 33. The U-shaped bracket 26 limits the upward movement of the grainward end of the bar 24, and the swinging arm 27 is adapted to lock it against downward movement when its upper end is swung beneath it, as shown in Fig. 3. A coiled spring 36 surrounds the link 29 and operates between a pin or collar on the link and the upper end of the arm 27 to hold the hooked end of the link in contact with the swinging arm.

When the operator desires to discharge the accumulated load from the sheaf-carrier, he presses down upon the foot-lever and through its connections operates the clutch-shipping lever in a direction to cause the members of the clutch to engage and drive the endless apron of the sheaf-carrier in a direction to deliver the load upon the ground, and at the same time the foot-lever through its connections with the swinging arm 27 will release the rear end of the bar 24, and the pressure of the bundles being discharged will raise the opposite end. A spring under the foot-lever operates to return the parts to their initial positions.

What I claim as my invention, and desire to secure by Letters Patent, is—

1. In a sheaf-carrier for harvesters, the combination of a carrier-frame, an endless carrier suitably mounted in said frame, a binding attachment adapted to deliver the sheaves to said carrier, a bar vibratile about a horizontal pivot carried by said binding attachment and overhanging said carrier, said bar provided with depending fingers adapted to close the delivery end of said carrier, means for holding said bar in its closing position, and means for releasing said holding means.

2. In a sheaf-carrier for harvesters, the combination of a carrier-frame, an endless carrier suitably mounted in said frame, means for intermittently operating said carrier comprising a clutch mechanism and a clutch-shipping lever, means for operating said clutch-shipping lever, a binding attachment adapted to deliver the sheaves to said carrier, a bar vibratably mounted on said binding attachment, overhanging said carrier and provided with depending outwardly-curved fingers adapted to close the delivery end of said carrier, means for holding said bar in its closing position, and means connected with said clutch-shipping mechanism for releasing said holding means.

3. In a sheaf-carrier for harvesters, the combination of a carrier-frame, an endless carrier suitably mounted in said frame, means for intermittently operating said carrier, comprising a clutch mechanism and a clutch-shipping lever, means for operating said clutch-shipping lever, a binding attachment adapted to deliver the sheaves to said carrier, a bar vibratably mounted on said binding attachment, overhanging said carrier and provided with depending outwardly-curved fingers adapted to close the delivery end of said carrier, a swinging bar adapted to contact with the vibratile bar and lock it in its closing position, and means connected with said clutch-shipping mechanism for swinging said locking-bar and releasing the vibratile bar.

4. In a sheaf-carrier for harvesters, the combination of a carrier-frame, an endless carrier suitably mounted in said frame, means for intermittently operating said carrier, comprising a clutch mechanism and a clutch-shipping lever, means for operating said clutch-shipping lever, a binding attachment adapted to deliver the sheaves to said carrier, a bar vibratably mounted on said binding attachment, overhanging said carrier and provided with depending outwardly-curved fingers adapted to close the delivery end of said carrier, said bar extending grainward of its pivot, a swinging bar mounted upon the binding attachment and having one end normally held in contact with the vibratile bar in a manner to lock it in its closing position, and means connected with said clutch-shipping mechanism for swinging said locking-bar to release the vibratile bar.

5. In a sheaf-carrier for harvesters, the combination of a carrier-frame, an endless carrier suitably mounted in said frame, means for intermittently operating said carrier, comprising a clutch mechanism and a clutch-shipping lever, means for operating said clutch-shipping lever, a binding attachment adapted to deliver the sheaves to said carrier, a bar vibratably mounted on said binding attachment, overhanging said carrier and provided with depending outwardly-curved fingers adapted to close the delivery end of said carrier, said bar extending grainward of its pivot, a U-shaped bracket said bar passing between the arms of the U-shaped bracket which limits its movement in one direction, a locking-bar pivotally connected with the U-shaped bracket and normally operative to lock the said vibratile bar against movement in an opposite direction, and means connected with said clutch-shipping mechanism for disengaging said locking means from said vibratile bar.

6. In a sheaf-carrier for harvesters, the combination of a carrier-frame, an endless carrier suitably mounted in said frame, means for intermittently operating said carrier, comprising a clutch mechanism and a clutch-shipping lever, means for operating said clutch-shipping lever comprising a lever mounted upon the harvester within reach of the operator, said lever having a link connection with a bell-crank lever also mounted on the harvester, said bell-crank lever being connected with said shipping-lever in a manner to move it in one direction to cause engagement of said clutch mechanism, a binding attachment adapted to deliver the sheaves to said carrier, a bar vibratably mounted on said binding attachment, overhanging said carrier and provided with depending outwardly-curved fingers adapted to close the delivery end of said carrier, said bar extending grainward of its pivot, a locking-bar pivotally mounted and having one end normally held in contact with the vibratile bar in a manner to lock it in its closing position, a rock-shaft supported upon the harvester and provided with cranks upon its opposite ends, said rock-shaft connected with the clutch-shipping mechanism and said locking-bar in a manner to disengage said locking-bar from said vibratile bar when the clutch-shipping mechanism is moved in one direction.

In witness whereof I hereto affix my signature in presence of two witnesses.

DANIEL W. SMITH.

Witnesses:
ALFRED M. CHRISTIAN,
G. W. HENDERSON.